US010070254B2

(12) United States Patent
Lacasse et al.

(10) Patent No.: US 10,070,254 B2
(45) Date of Patent: Sep. 4, 2018

(54) SYSTEM, METHODS AND NODES FOR PROVIDING ZONE-BASED SERVICES BASED ON PAIRINGS BETWEEN COMPATIBLE PROFILES

(71) Applicant: UNIVERSITE LAVAL, Quebec (CA)

(72) Inventors: Serge Lacasse, Saint-Romuald (CA); Guillermo Saldana, Quebec (CA)

(73) Assignee: UNIVERSITE LAVAL, Quebec (CA)

( * ) Notice: Subject to any disclaimer, the term of this patent is extended or adjusted under 35 U.S.C. 154(b) by 0 days.

(21) Appl. No.: 15/820,765

(22) Filed: Nov. 22, 2017

(65) Prior Publication Data
US 2018/0098192 A1    Apr. 5, 2018

Related U.S. Application Data

(63) Continuation of application No. 14/359,931, filed as application No. PCT/CA2012/001068 on Nov. 19, 2012, now abandoned.
(Continued)

(51) Int. Cl.
*H04W 4/02* (2018.01)
*H04L 12/58* (2006.01)
(Continued)

(52) U.S. Cl.
CPC ......... *H04W 4/021* (2013.01); *H04L 12/1845* (2013.01); *H04L 12/1859* (2013.01);
(Continued)

(58) Field of Classification Search
CPC ...... H04W 4/021; H04W 4/206; H04L 51/20; H04L 12/1845; H04L 12/18; H04L 12/1859; H04L 51/043
See application file for complete search history.

(56) References Cited

U.S. PATENT DOCUMENTS 6,088,598 A      7/2000   Marsolais
6,208,866 B1 *   3/2001   Rouhollahzadeh .... G06Q 30/02
                                                      455/456.5
(Continued)

FOREIGN PATENT DOCUMENTS

EP       1967923 A2      9/2008
EP       2317729 A1      5/2011
(Continued)

OTHER PUBLICATIONS

Truchat, Sébastien et al., "Reconfigurable consumer direct logistic systems", Müller, Paul; Gotzhein, Reinhard; Schmitt, Jens B. (Ed): Kommunikation in Verteilten Systemen (KiVS) Kaiserslautern Feb. 28-Mar. 3, 2005), Bonn: Gesellschaft für Informatik, 2005, pp. 104-111 (Gi-Edition Lecture Notes in Informatics vol. P-61), ISBN 3-88579-390-3.
(Continued)

*Primary Examiner* — Brandon J Miller
(74) *Attorney, Agent, or Firm* — BCF LLP

(57) ABSTRACT

Disclosed methods and systems allow provision of zone-based services to users. Both zones and users have their own profiles. A detection system allows determining when users enter or leave a zone. A pairing is calculated between compatible elements of zone profiles, or between compatible elements of the user profiles. Delivery of zone-based services may conditionally be granted according to a level of the pairing. Pairings may also be established between users or between zones. A server may manage profiles for the zones and for the users.

10 Claims, 9 Drawing Sheets

Related U.S. Application Data

(60) Provisional application No. 61/562,532, filed on Nov. 22, 2011.

(51) Int. Cl.

| | | |
|---|---|---|
| *H04W 4/20* | (2018.01) | |
| *H04L 12/18* | (2006.01) | |
| *H04W 4/021* | (2018.01) | |
| *H04W 4/21* | (2018.01) | |

(52) U.S. Cl.
CPC ............ *H04L 51/043* (2013.01); *H04L 51/20* (2013.01); *H04W 4/206* (2013.01); *H04W 4/21* (2018.02)

(56) References Cited

U.S. PATENT DOCUMENTS

| | | | |
|---|---|---|---|
| 7,027,801 B1* | 4/2006 | Hall | ............... G06Q 30/02 455/412.1 |
| 7,069,308 B2 | 6/2006 | Abrams | |
| 7,071,842 B1 | 7/2006 | Brady, Jr. | |
| 7,120,695 B2 | 10/2006 | Nilsson et al. | |
| 7,280,822 B2 | 10/2007 | Fraccaroli | |
| 7,343,165 B2 | 3/2008 | Obradovich | |
| 7,551,930 B2 | 6/2009 | Lempio et al. | |
| 7,693,752 B2 | 4/2010 | Jaramillo | |
| 7,875,215 B2 | 1/2011 | Brady, Jr. | |
| 7,876,214 B1 | 1/2011 | Brady, Jr. | |
| 7,890,581 B2 | 2/2011 | Rao et al. | |
| 7,890,957 B2 | 2/2011 | Campbell | |
| 7,894,987 B1 | 2/2011 | Tester et al. | |
| 8,224,353 B2* | 7/2012 | Wright | ............... G06F 17/3087 455/456.3 |
| 8,238,921 B2 | 8/2012 | Chang | |
| 2002/0022475 A1 | 2/2002 | Tsuneki | |
| 2005/0148342 A1 | 7/2005 | Sylvain | |
| 2006/0121990 A1 | 6/2006 | O'Kelley, II | |
| 2008/0004002 A1 | 1/2008 | Chin | |
| 2009/0198666 A1 | 8/2009 | Winston et al. | |
| 2009/0296505 A1 | 12/2009 | Shibazaki et al. | |
| 2011/0071894 A1* | 3/2011 | Nesamoney | ........... G06Q 30/02 705/14.25 |
| 2011/0106719 A1 | 5/2011 | Wang et al. | |
| 2011/0179064 A1 | 7/2011 | Russo | |
| 2012/0088487 A1 | 4/2012 | Khan | |
| 2013/0103480 A1* | 4/2013 | Lechner | ................. G06Q 30/02 705/14.25 |
| 2014/0323159 A1* | 10/2014 | Ramaswamy | ........ H04W 4/021 455/456.3 |

FOREIGN PATENT DOCUMENTS

| | | |
|---|---|---|
| JP | 2000-167232 A | 6/2000 |
| JP | 2005-250841 A | 9/2005 |
| WO | 99/63774 A1 | 12/1999 |
| WO | 2008124074 A1 | 10/2008 |
| WO | 2009117455 A1 | 9/2009 |

OTHER PUBLICATIONS

Borrego-Jaraba, Francisco et al., "NFC Solution for the Development of Smart Scenarios Supporting Tourism Applications and Surfing in Urban Environments", Jun. 1, 2010, Trends in Applied Intelligent Systems, Springer Berlin Heidelberg, Berlin, Heidelberg, pp. 229-238.
Office Action dated Nov. 6, 2017 in corresponding Japanese application 2014-542650.
English abstract of JP 2000-167232.
English abstract of JP 2005-250841.

* cited by examiner ns="en"># SYSTEM, METHODS AND NODES FOR PROVIDING ZONE-BASED SERVICES BASED ON PAIRINGS BETWEEN COMPATIBLE PROFILES

TECHNICAL FIELD

The present disclosure relates to the field of mobile services. More specifically, the present disclosure relates to a system, methods and nodes for providing zone-based services based on pairings between compatible profiles.

BACKGROUND

Current location based service solutions are based on geolocation mechanisms that rely on Global Positioning System (GPS) technology, location of WiFi transmitting stations, and the like. These solutions are ill-adapted for indoor detection, positioning in shopping centers, subways or other underground spaces, or for discriminating between floors of a building. Moreover, current solutions do not adequately support location based intelligent interactivity.

Another problem lies in the absence of a true bond between virtual worlds and the real world. Virtual connections between users may be established over the Internet. However, the Internet may only provide a disembodied communication between users, without accounting for their actual physical location.

Therefore, there is a need for techniques for enabling the provision of zone-based interactive services.

SUMMARY

According to a first aspect of the present disclosure, there is provided a method for providing zone-based services to users. A profile of a user is defined in a server, the profile of the user including a plurality of elements referring to interests of the user. A profile of a zone is defined in the server, the profile of the zone including a plurality of elements referring to services provided by the zone. The zone may be one of a geographical area, a physical area and a web site. The server detects an access of a terminal of the user in the zone. The server calculates a pairing as a function of a number of matches between common elements of the profile of the zone and of the profile of the user. The server forwards information including a service offer to the terminal of the user if the pairing meets or exceeds a threshold.

In a second aspect of the present disclosure, there is also provided a method for providing zone-based services to users. A server receives, from a first terminal, a searched profile of a first user, the searched profile of the first user comprising one or more elements of a profile of another user that are searched by the first user. The searched profile of the first user is received at a second terminal of a second user. The second terminal forms a displayed profile of the second user, the displayed profile of the second user comprising one or more elements of a profile of the second user that are selected by the second terminal for transmission to the server in response to a content of the searched profile of the first user. The server receives, from the second terminal, the displayed profile of the second user. The server calculates a pairing between common elements of the searched profile of the first user and of the displayed profile of the second user. The server detects an access of the second user in a zone, the zone being one of a geographical area, a physical area and a web site. The server controls an establishment of a communication between the first and second terminals of the first and second users if the pairing meets or exceeds a threshold value.

In a third aspect, the present disclosure provides a system for providing zone-based services to users. The system comprises a plurality of detection systems associated with zones and adapted for detecting accesses of the users in the zones, each zone being one of a geographical area, a physical area and a web site. The system also comprises a server communicatively coupled to the detection systems and comprising a database adapted for storing a profile of each zone and for storing a profile of each user. The profile of each user includes a plurality of elements referring to interests of the user, the profile of each zone including a plurality of elements referring to services provided by the zone. The server is configured to receive, from a detection system associated with a given zone, information about an access to the given zone by a terminal of a given user, calculate a pairing as a function of a number of matches between common elements of a profile of the given zone and of a profile of the given user, and forward to the terminal of the given user information including a service offer to the given user if the pairing meets or exceeds a threshold value.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

DETAILED DESCRIPTION

Figure 1:
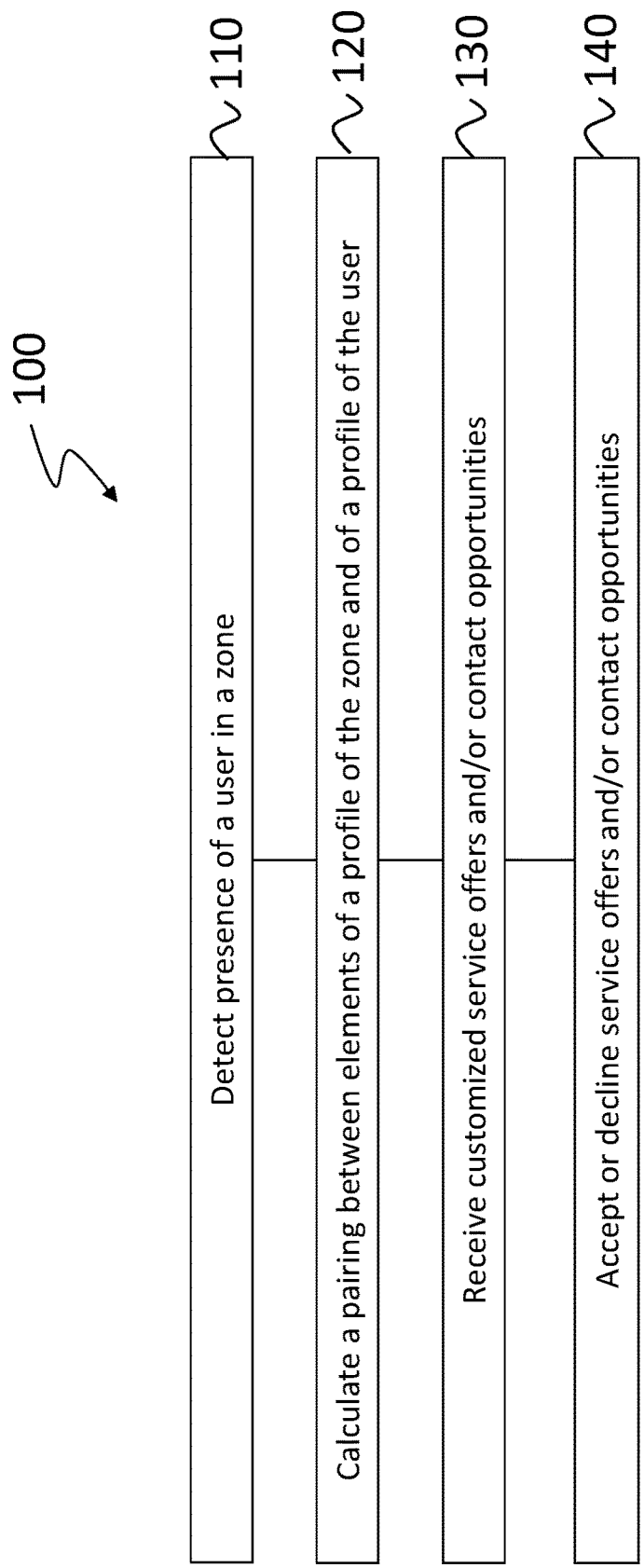
FIG. 1 is a flowchart showing an example of a sequence for granting a zone-based service to a user.

Various aspects of the present disclosure generally address one or more of the problems of detecting users accessing a zone (physically or virtually) and providing the users with advanced services based on profile compatibility.

The present disclosure combines, in a complementary way, (1) using a presence detection system for identifying users accessing a zone, (2) offering to detected users or to users virtually visiting a zone a secure and interactive communication link, (3) offering a fixed or mobile interactive spatial communication reference, (4) valorization of a time factor for a limited time duration of a communication space, and (5) a possibility to adapt and group services and applications, such as for example product orders, road guidance, safety video camera, programs, alarm messages, and the like. A combination of some or all of from these five (5) principles amounts to a concept of intelligent zones.

The following terminology is used throughout the present disclosure:

Wireless communication: communication between two communication devices via radio communication, infrared communication, ultrasound communication, or like means for propagating information.

Terminal: one of many types of user devices capable of having bi-directional communication with a network.

Mobile terminal: a portable terminal capable of wireless communication with a network.

User: a person accessing a system disclosed herein through a terminal or a mobile terminal.

Zone: a physical or geographical area, of any size, which may offer services to users or other zones; by extension, the zone may comprise site equipment for detecting user presence.

Service: any useful zone-related function offered for the benefit of a user or for the benefit of a zone, whether or not the user or the zone is charged therefor.

Profile: a representation of at least one characteristic of a user or his/her terminal (user profile, also called terminal profile), or a representation of at least one characteristic of a zone (zone profile); in the context of the present disclosure, any mention of a profile may comprise an entire profile, a subset of an entire profile, or a profile among a plurality of profiles of a given user or of a given zone. A plurality of profiles may be active at the same time. A given profile, or part of a profile may be confidential.

General Profile: A general profile may be created by an entity defining its basic characteristics.

Displayed profile: A representation of at least one characteristic about an entity (user or zone) that is accessible to other entities (users or zones) at a given time.

Searched profile: A representation of at least one characteristic that an entity (user or zone) requires from other entities (users or zones) at a given time.

Detection: the act of manually or automatically discovering the presence of a user, or of his/her terminal, within a zone, or his/her departure from the zone.

Detection system: equipment used to detect presence, entry or exit of a user from a zone; the detection system may comprise dedicated site equipment at a zone; alternatively, nodes of a cellular network, of a WiFi system, of a Wimax system, of a Bluetooth system, or other similar devices may be associated with the zone for use as a detection system.

Geolocation: identification of a geographical location of a person or device, for example but not limited to using the Global Positioning System (GPS).

WiFi: a wireless connectivity technology based on the IEEE 802.11 family of standards.

Wimax (Worldwide Interoperability for Microwave Access): a wireless connectivity technology based on the IEEE 802.16 family of standards.

Bluetooth: a proprietary, but open technology for wirelessly exchanging data over short distances.

Pairing: profile-based association between two (or more) entities, wherein the entities may comprise users and/or zones.

Server: a network node or a group of network nodes that stores and manages information about entities (users or zones), such as profiles, detection, zone delimitation, statistics, and the like, as well as any other form of content, and performs pairings between entities.

The present disclosure introduces a method, nodes, and a system for providing zone-based services, as disclosed herein. The disclosure involves a clarification of fundamental user needs related to zone-based services, leading to a definition of intelligent zones.

Two types of entities are defined, comprising zones and users. A system server manages information about the two types of entities. The system server may store, for each zone, nominal data, information about commercial contents and services available within coverage of the zone, profiles of the zone, and information concerning presence of users in the zone, obtained through automatic or manual detection, for example using special software, compatible with features of the overall system, implemented in a terminal of a user. The system server may store, for each user, nominal data, one or more user profiles including confidential parts of user profiles, statistics about user behavior, location information including current or earlier presence in a given zone. In various embodiments, the system server may be realized as a central server, a network of servers, a distributed server, a server specific to each zone, or any other similar configuration serving the same purpose. When more than one server is present, some servers may treat some type of information elements while others may treat other types of information elements. Alternatively, a plurality of servers may support the same functions, in a load-sharing fashion. A zone-specific server may be connected to a central server, complementary features being implemented in the central server and in the zone-specific server. In yet another embodiment, a zone-specific server may operate in isolation. When a zone has a zone-specific server, features of the zone-specific server may be construed as features of the system server. In the context of the present disclosure, mentions of "system server" may relate to any of the above-mentioned server configurations, including combinations thereof.

The present solution allows providing a broad range of services, including services available only through the present system, while also integrating existing services. The disclosed system uses in a complementary manner various types of links. Links may be established between two or more users, between a user and a service provider, for example a commercial application, or even between two or more zones. In this way, it is possible to deliver, within a zone, mobile communication services that promote local value-added services or contents, which are offered exclusively in the zone.

The present disclosure also overcomes the absence of a true bond between virtual worlds and the real world. Virtual visits provide users the possibility to be simultaneously in contact with a plurality of zones. Unlike the Internet, which may provide a disembodied communication between users without accounting for their actual physical location, the present disclosure becomes an open door to establishment of actual contacts between users at a given moment and at a given physical location. These types of contact take several forms, including interaction between a user and a zone, zone-based interaction between users, interaction between zones, virtual visit to a zone, interaction with fixed computers, with fixed terminals, with stations especially installed for providing zone-based services, with mobile terminals, and the like.

Moreover, the system server manages in a general way the following data types: delimitation of the coverage areas of the zones and neighboring relations of the zones, detection of users accessing or leaving a zone, user and zone profiles, statistics, content, etc., and establishment of relations between the data. The system server also may allow or deny data access or service access.

Zones are areas in which users may enter, reside for a time period before leaving again. A zone thus represents a virtually or physically delimited space in which a user may be located and benefit from a service. Creation of these intelligent zones allows interactive, secure and adapted communication services, indoors as well as outdoors. A system built on such zones offers location adapted information to users physically or virtually present in a given location. Examples of location adapted information may comprise local service offerings, publicity, local information, news alerts, multimedia content, software applications, software downloads, and exchange of information with third parties software or database, and the like. As a specific example, a user may visit a zone having a coverage corresponding to a coffee shop. Based on a user profile, which may include consumer habits of the user, and based on a profile of the zone that incorporates the coffee shop, the user may be immediately greeted with his preferred coffee brew as he enters the coffee shop, and the beverage may be billed to his account.

The system thus comprises intelligent zones that may interact with users whose presence is detected within the zone, or as a result of a virtual visit from outside one of the zone. A communication is established between the user/mobile and the system server as soon as the server is informed that the user has accessed a zone. An interactive contact may be established between users (individuals and/or businesses) within and/or outside of the zones, using terminals equipped with special software compatible with the overall system for offering and for requesting information and/or for marketing, by means of specific profiles, services, contents, and the like. Contact may also be established between zones, for example between two neighboring zones, when one zone offers a service that the other zone may use, or when one zone may redirect users to the other zone.

In fact, the present disclosure involves an ability to determine whether or not a user is present within coverage of a zone, whether indoors or outdoors, including user presence on a given floor of a multi-story building. It should be observed that some earlier geolocation techniques, such as GPS, do not provide a required amount of location granularity for some of the location base services. In addition, GPS coverage may be poor or inexistent in many indoor locations, especially in underground locations in shopping centers, subways, underground areas, or in multi-story buildings. The disclosed system avoids limits imposed by GPS geolocation. In contrast to existing solutions that are based on geolocation, through the use of GPS, location of WiFi access points, and the like, the present system makes it possible to determine an access location in any type of zones, whether or not such location is detectable at a sufficiently fine granularity by conventional geolocation mechanisms. In a variant, detection equipment specifically dedicated to detection of users in a zone may further provide an alternative Internet access to its users. For example, a zone where a user may be located may comprise all or a part of a shopping center, a subway, an underground location, a floor of a multi-story building, and the like. The zones may have various sizes, from broad external spaces, for example an outdoor music festival, to very small spaces, for example a space in front of a kiosk in a congress center. Location methods used herein allow avoiding limits imposed by existing types of geolocation. This in turn allows providing of a broad range of services.

The system may include at least two types of detection: An automatic detection, a manual detection, or a combination of automatic and manual detection of the localization of the users may be made. Any one or both of these two types of detection may be used, according to the needs of a particular implementation.

Manual detection may require an action of the user, for example a reading of a barcode or of a Q-Code by his intelligent mobile terminal, or a manual input of a code when a user reaches a given location. Automatic detection may for example have recourse to various solutions for the detection of mobile terminals when a user reaches a zone, including but not limited to ultrasounds, microwaves, WiFi, Wimax, chips, Bluetooth, smart card, and the like. A mobile terminal may detect entry into a zone by detection of a service set identification (SSID) emitted by a WiFi or Bluetooth station. Location updating mechanisms of well-known cellular systems may also be used as a form of automatic detection, or complement other forms of automatic detection. These types of detection may be used individually or complementarily, according to the needs of a specific application. In some cases, a mobile terminal may be able to manage both detection types, according to hardware and software features implemented in the mobile terminal.

For example, a congress center could use an automatic control for all accesses, additionally having recourse to barcodes for precisely locating users at a given kiosk. In the case of external zones, where manual reading of codes bars may not be practical, if one needs to know at what time a user leaves the zone, several alternative methods may be used singly or in various combinations:

1) Access to another zone: as a user reaches a new zone, the system server obtains information about the detection of the user accessing the new zone and thus automatically assumes the user has left the previous zone.
2) Interaction time between the system server and the user: after a certain inactivity time, the system server may contact the user to confirm whether or not he/she has left the zone.
3) By geolocation: a geolocation system, for example GPS, cellular tower, a WiFi access point, may detect that a user has left a zone and provide this information to the system server.
4) Generally, automatic location updating in the system server when users enter the zones facilitates cancellation of user presence information in the preceding zones.

The present disclosure also introduces aspects of "virtual visits" of a zone. Thus, a user may be located outside of any zone but be able to visit any zone virtually. A user may also be located (physically or virtually) in several zones at the same time. For example, while being physically located in one zone, a user may be located at the same time in other zones virtually. The disclosure therefore includes the possibility of being physically in a given zone and obtaining a service offered by this zone, as well as obtaining a service from a different zone that is accessed virtually.

By combining different kinds of information (detection, zone delimitation, profiles, content, and the like) the system server may establish relations between the data.

Referring now to the drawings, FIG. 1 is a flowchart showing an example of a sequence for granting a zone-based service to a user. A sequence 100 comprises a first step 110 of detecting a presence of a user in a zone; the user may then be alerted that he has accessed the zone. Of course, the user owns a terminal used for acquiring zone-based services. At step 120, a pairing is calculated by the system server between elements of the zone profile and of the user profile. At step 130, the user receives customized service offers and/or contact opportunities. Then, at step 140, the user accepts or declines these offers and/or opportunities. In an embodiment, a threshold value may be determined by the server. The threshold value may be any value indicative of at least a minimal level of compatibility between the profiles. In another embodiment, the threshold may comprise any positive, non-zero value.

Figure 2:
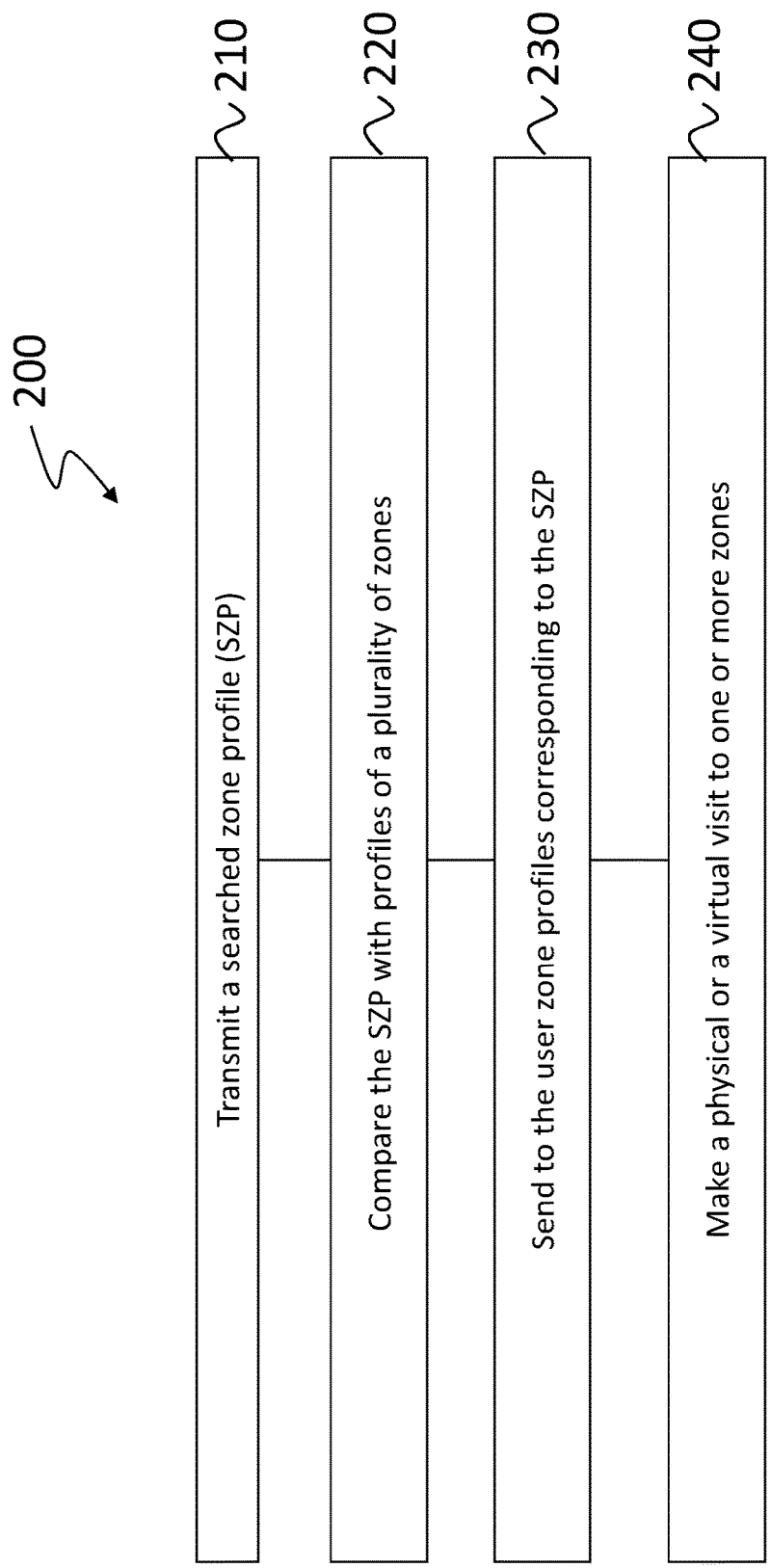
FIG. 2 is a flowchart showing another example of a sequence for granting a zone-based service to a user located outside of the zone.

FIG. 2 is a flowchart showing another example of a sequence for granting a zone-based service to a user located outside of the zone. A sequence 200 comprises a first step 210 of transmitting a searched zone profile (SZP) by the user. Then, at step 220, the system server compares the SZP with profiles of a plurality of zones. At step 230, the system server sends to the user/mobile zone profiles corresponding to the SZP. At step 240, the user may choose to visit either physically or virtually one or many zones that were sent by the system server. Once in a zone (virtually or physically) the user has now access to the services.

Figure 3:
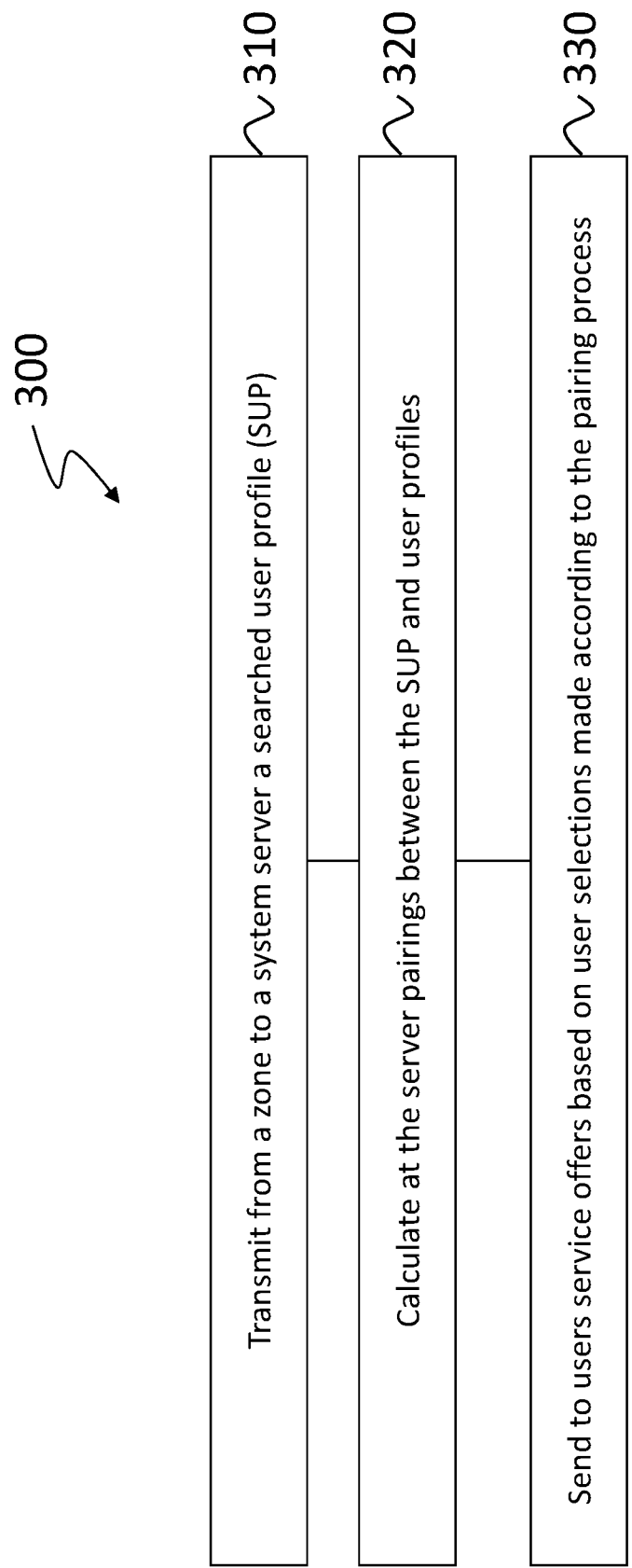
FIG. 3 is a flowchart showing an example of a sequence for sending service offers from a zone to users.

FIG. 3 is a flowchart showing an example of a sequence for sending service offers from a zone to user terminals. A sequence 300 comprises a first step 310 of a zone transmitting towards the system server a Searched User Profile (SUP). At step 320, the system server calculates pairings between the SUP and the user profiles, which may notably include information about the consumer habits of the user. At step 330, users whose profile has been selected following the pairing process receive service offers from the zone at the user terminal. In an embodiment of the terminal, at least some of the steps of the sequence 300 may be implemented using the terminal software compatible with features of the overall system.

Figures 4, 5:
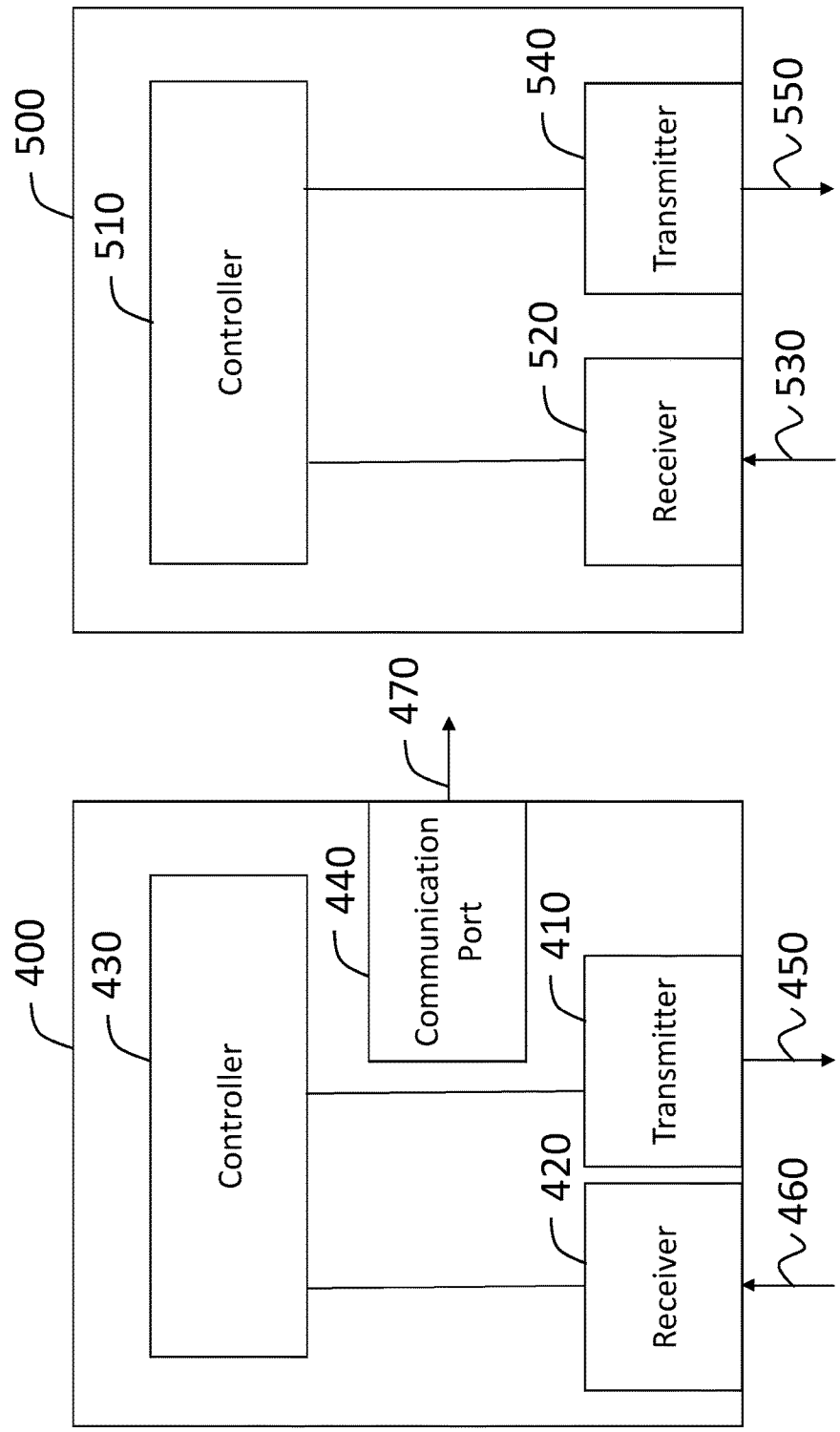
FIG. 4 is a simplified block diagram of an example of a detection system within a zone.
FIG. 5 is a simplified block diagram of an example of mobile terminal.

FIG. 4 is a simplified block diagram of an example of a detection system within a zone. A detection system 400 contributes to the detection process allowing discovering entry and departure of users. The detection system 400 may comprise a transmitter 410, a receiver 420, a controller 430 and a communication port 440. The transmitter 410 may transmit 450, within a coverage area of the zone, a signal intended to be received by mobile terminals when present within the zone boundaries. In an embodiment, the signal may comprise a general system code as well as an identification code of the zone related to services disclosed herein, supported by the system server. In a variant, dedicated codes may be used to distinguish between entry in the zone, ongoing presence in the zone, and departure from the zone. Alternatively, the detection system 400 may display a barcode or a Q-code (not shown) that may be read by a user's mobile terminal in order to provide the aforementioned codes. The transmitter 410 may or may not be present in embodiments displaying a barcode or a Q-code. In any case, the receiver 420 receives 460 from a mobile terminal a signal indicating that the mobile terminal is entering or leaving the zone coverage area. Communication between the detection system 400 and mobile terminals may rely on various access technologies and methods, including but not limited to ultrasounds, microwaves, WiFi, Wimax, radiofrequency identification (RFID), chips, Bluetooth, and the like. The system server manages information from the detection system 400. The detection system 400 may forward a message 470 to the system server, via the communication port 440, indicating that the user has entered or left the zone coverage area. Those of ordinary skill in the art will appreciate that the detection system 400 may not be dedicated to the detection of users in a zone, but may be part of any radio communication network. Consequently, they will recognize that the detection system 400 may also comprise other components, not shown on FIG. 4, for providing wireless communication services or for communicating with other nodes.

FIG. 5 is a simplified block diagram of an example of mobile terminal. Mobile terminal 500 comprises a receiver 520, a transmitter 540 and a controller 510. The receiver 520 receives 530 a displayed zone profile (DZP) and a searched user profile (SUP). The controller 510 selects a displayed user profile (DUP) and a searched zone profile (SZP) based on a desired service corresponding to the DZP. In an embodiment, selection of the DUP may comprise editing by the user, via a keypad (not shown) connected to the controller 510, or via a touch-sensitive screen (not shown) connected to the controller 510, of one or more information elements of a generic user profile in order to better match a service that a user wishes to access, for example in accordance with the DZP and/or with the SUP. In an embodiment, a generic user profile may comprise a name, age, occupation and/or an address of the user, as well as other types of information related to the user's consumer habits. For example a user profile element may indicate that his consumer habits involve frequently making purchases of a given type. The transmitter 540 transmits 550 the DUP and the SZP. Those of ordinary skill in the art will appreciate that software may be used by the mobile terminal 500 to support some or all of the features described hereinabove and that the mobile terminal may also comprise other components, not shown on FIG. 5, for setting up wireless communication with zones or with other networks, or for displaying information to its user.

Figure 6:
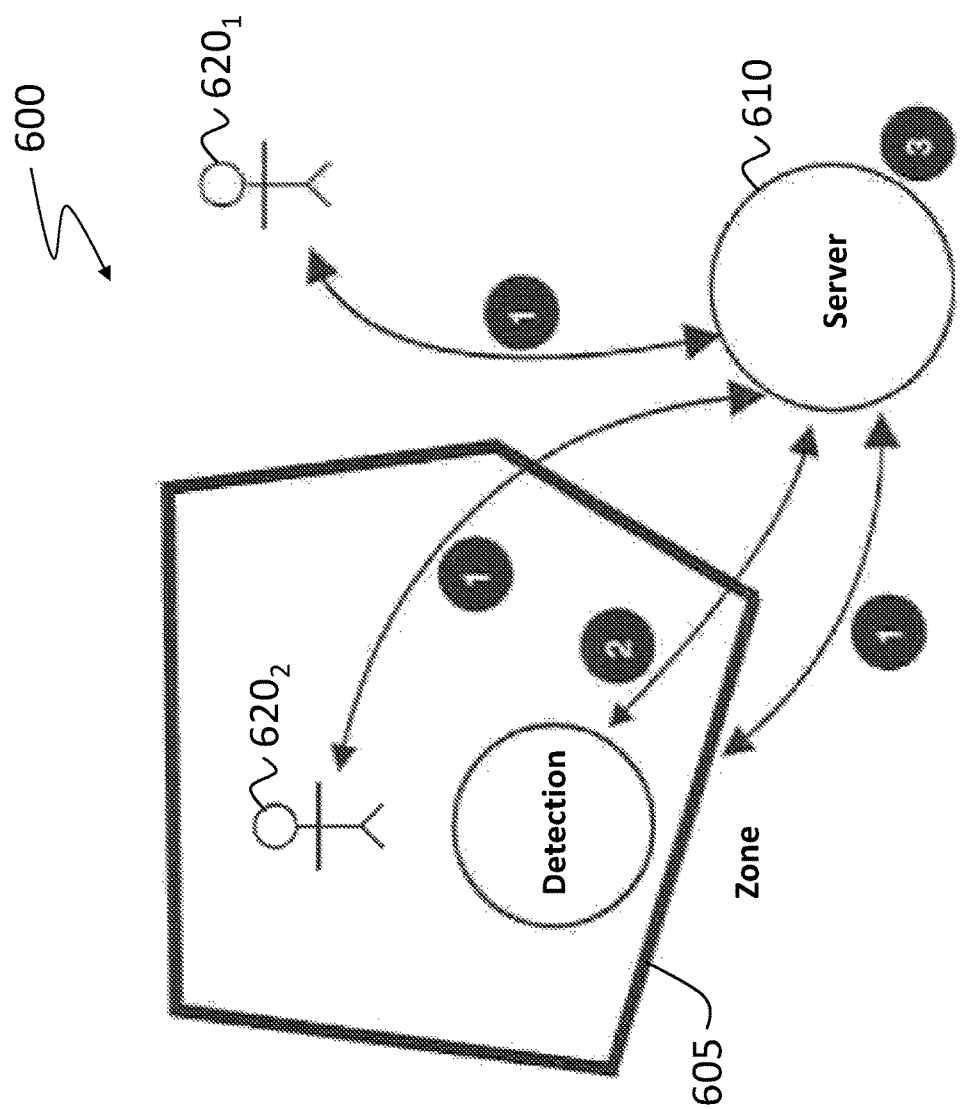
FIG. 6 is a basic diagram showing examples of interaction between users, a zone and a server.

FIG. 6 is a basic diagram showing examples of interaction between users, a zone and a server. A system 600 comprises users $620_i$, a zone 605 and a system server 610 connected via wireless or wired communication links and forming a network. Of course, the system 600 is greatly simplified for ease of illustration, and a typical network may comprise a plurality of zones and a very large number of users.

In an embodiment, the system 600 may comprise a plurality of delimited zones, such as zone 605, having zone coverage for providing zone-based services to mobile terminals of the users $620_i$. The system server 610 manages various types of information. The system server 610 is communicatively coupled with the detection system 400 and comprises a database of areas of coverage of each zone 605 and a database for storing detection information about the mobile terminals. The detection system 400 may identify a presence of a given mobile terminal in the zone 605 and inform the system server 610 of the presence of the given mobile terminal (arrow #2). The terminals communicate with the system server by means of a wireless communication network (not shown) such as for example a cellular network, a 3G network, a 4G network, a WiFi network, or a network dedicated to supporting the zones 400 (arrows #1). Users or zones can either activate an existing profile located in the system server or create a new one according to immediate needs. The system server 610 can calculate a pairing between compatible elements of the different profiles according to the needs. Alternatively or in addition, in calculating the pairing, the system server 610 may consider user profile elements that are stored in a memory of the system server 610 and that have not necessarily been received as a part of displayed profiles, because some profile elements may be kept confidential within the system server 610 or because it may be more efficient to maintain permanent or semi-permanent elements of a generic profile in the system server 610, thereby avoiding a need to transmit those elements with the displayed profiles. In yet another embodiment, the system server 610 may store in memory elements of the displayed profiles, for eventual future use. The system server 610 can conditionally authorize a delivery of a service to the mobile terminal if the pairing meets or exceeds a threshold value.

Steps shown on FIG. 6 are as follows:

1—The zone 605 and mobile terminals of users $620_1$ and $620_2$ exchange data with the system server 610, including for example profile information, nominal information, geographical maps, and the like.

2—According to the zone needs, the detection system 400 may determine a) the user $620_2$ access to the zone 605, b) its presence within the zone 605 or c) its departure from the zone 605.

3—The system server 610 parses data:
  a. the system server 610 facilitates user to user interaction, for users located physically ($620_2$) or virtually ($620_1$) within the zone 605.
  b. the system server 610 facilitates interaction between the zone 605 itself and a user, whether the user is physically or virtually within the zone.
  c. concurrently, the system server 610 treats other types of data for example gathering statistics, managing communication interfaces, providing messages of general interest, manages detection systems 400, zone delimitation, pairing, dedicated applications, and the like.

The system server 610 may further act as a data relay.

Figure 7:
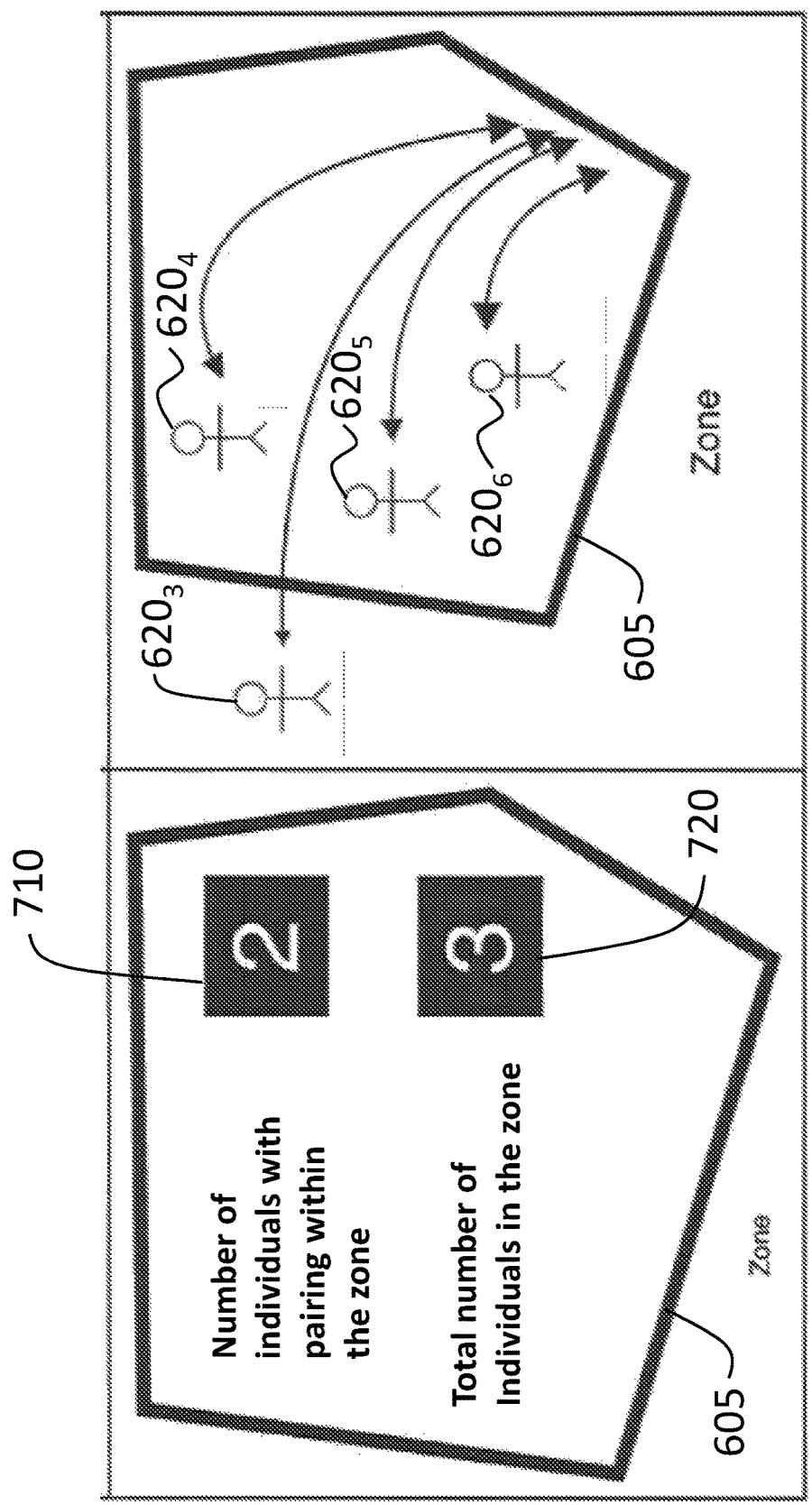
FIG. 7 is a schematic, simplified representation of a zone showing presence of users within the zone and showing information elements about users present in the zone.

Information concerning a number of users present within the coverage of a zone may be accumulated. The system server controls interactions between the users, for example between users having compatible searched and displayed profiles, or between a user and the zone itself, or any other type of pairing. FIG. 7 is a schematic, simplified representation of a zone showing presence of users within the zone and showing information elements about users present in the zone.

Some or all of the users and zones have their own general profile and may have at a given time additional displayed or searched profiles.

In a particular aspect, at least some profile elements of a displayed profile, searched profile, user profile or zone profile may be obtained from external systems, for instance Facebook™, Foursquare™, LinkedIn™ and like social media systems, or any other similar external software, media, or any other communication platforms.

In another particular aspect, a user profile may either represent a person as an individual consumer, or a worker employed by a corporation, by a government organization, and the like. While a consumer profile may include information related to that user's personal interests, a worker profile may rather incorporate information related to that user's professional activities, including information related to zones where the worker has his/her professional activities. It is understood that a same person may have more than one user profile, alternating between a consumer profile and a worker profile. Both profiles of a same user may be linked to a same physical terminal and the user may activate one or the other of the profiles, or both profiles, at different times.

In yet another particular aspect, the system server 610 may add a third-party element to a zone profile. As an example, the system server 610 may add, to the profile of a zone including a night club, an advertisement for a particular beer brand. As another example, the system server 610 may add, to the profile of a zone including a restaurant, an advertisement for a neighboring movie theater. A variant of this aspect may consider the third-party as yet another user who may be placed in communication with a user visiting the night club or the restaurant. Any condition or restriction to the addition of third-party information to a given zone profile or to allowing connection between a third-party deemed a user and an actual person entering a zone may be handled by the system server 610 according to commercial agreements between the operator of the system server 610 and the owner of a zone, and between the operator of the system server 610 and the third-party.

The system server manages interaction between data associated with the different users and zones profiles. General profiles provide basic information about zones and users, including some consumer habits. Displayed profiles contain specific data that zones or users wish to render available at a given time. Searched profiles relate to zones or users characteristics as sought by zones or by users at a given time. These profiles (General, Displayed, Searched) may be edited by users and zones through their respective terminals. In an embodiment, upon receiving profiles corresponding to a pairing process by the system server, a given mobile terminal may alert its user $620_i$ about these received profiles. In response, the given user $620_i$ may or not access to interactive activities involving either other users or zones.

As shown on the left-hand side of FIG. 7, two information elements are maintained about users/mobile terminals currently physically located within its coverage of the zone 605:

A first number 710, which is set to two (2) in the example of FIG. 7, represents a number of users present in the zone 605, whose profile has sufficient compatibility following a paring process.

A second number 720, which is set to three (3) in the example of FIG. 7, represents a total number of users physically present in the zone.

The right-hand side of FIG. 7 illustrates interactivity between the zone 605 and various users $620_i$ visiting the zone 605. Considering at once the left-hand side and the right-hand side of FIG. 7, one user located outside the zone ($620_3$) transmits a Searched User Profile to the system server. From the number 710 of compatible users in the zone 605, only two (2) of the users $620_i$ pairings may be found with sufficient compatibility with the searched profile. Because of the possibility to establish pairings between users $620_{4, 5, 6}$ located within the zone coverage, based for example on similar or complementary user profiles, the sheer presence of users $620_{4, 5, 6}$ within the zone may become a means to attract other users within the zone. It may be observed that while user $620_3$ is located outside of the zone 605, it may enter in communication with the zone 605. In this manner, the user $620_3$ may visit the zone 605 virtually. In an embodiment, when pairing is established between two (or more) users, the system server may provide each of these users with profile elements that users wish to render accessible to the other user(s) participating in the pairing. In another embodiment, the displayed user profile of a given user may remain inaccessible by other users. In yet another embodiment, user or zone profiles for business services may be made public without restriction.

Pairing between Compatible Profiles

The system server builds a dynamic and interactive contact list that is continuously established using a pairing mechanism on the basis of profiles provided by users and zones and the data provided by the detection system 400. Within the pairing mechanism, each contact is weighted, as explained hereinbelow.

Figure 8:
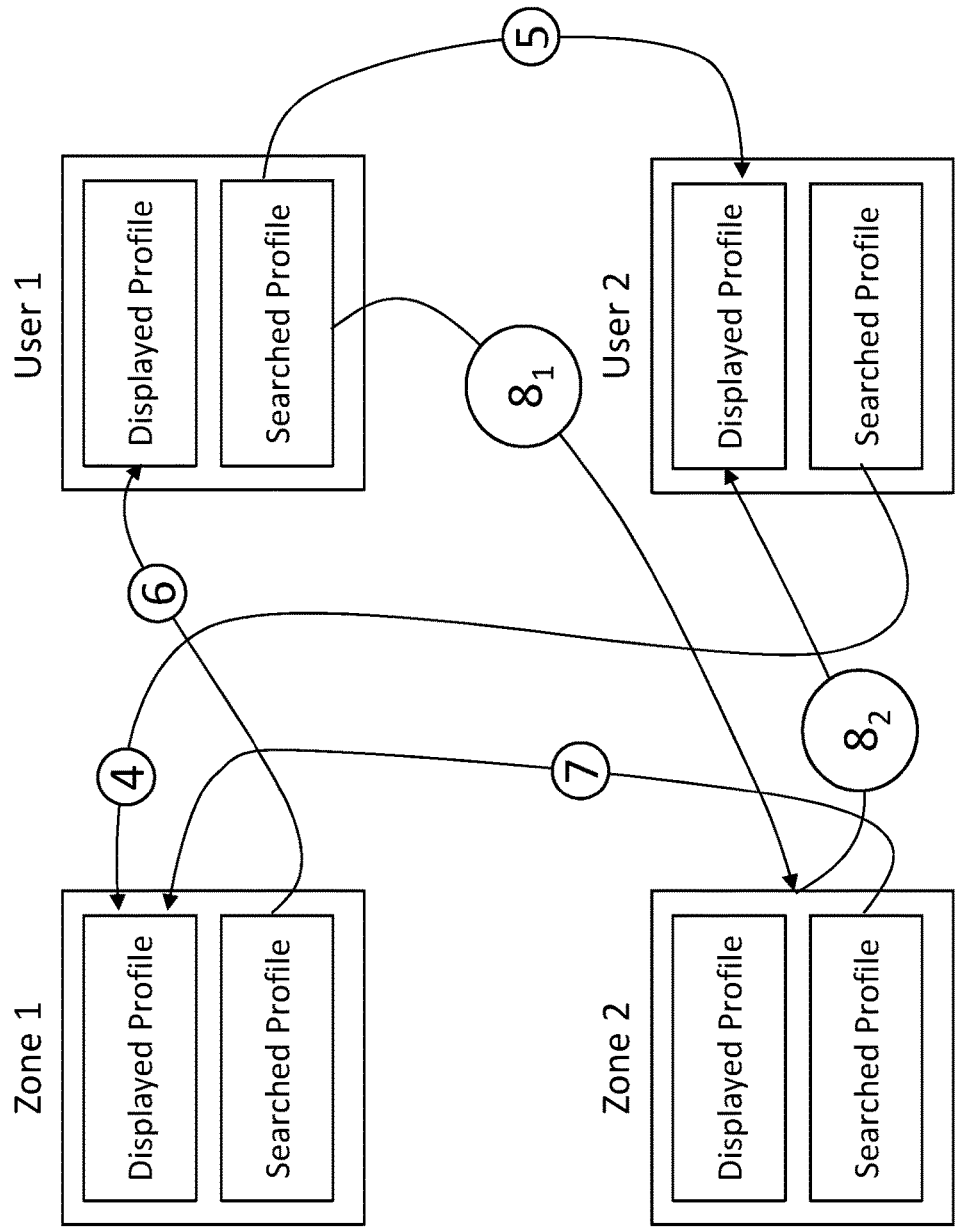
FIG. 8 shows examples of associations that may be established between various user profiles and zone profiles.

FIG. 8 shows examples of associations that may be established between various user profiles and zone profiles. On FIG. 8, various arrows 4-8 indicate examples of possible relations between the profiles of the zones and of the individuals based on their profiles. A valid relation between two entities, whether between a user and a zone, between two users, or between two zones, has a pairing (or pairing level, PL) determined according to a number of common elements between the profiles of the two entities. If the PL between two entities is higher than a threshold level, contact is established between the entities.

FIG. 8 shows five (5) examples of pairing between profiles. In a first example (arrow 4), a user (U2) has a searched profile that matches a displayed profile of a zone (Z1). In a second example (arrow 5), a user (U1) has a searched profile that matches a displayed profile of another user (U2). In a third example (arrow 6), a zone (Z1) has a searched profile that matches a displayed profile of a user (U1), for example, for targeted marketing applications. In a fourth example (arrow 7), a zone (Z2) has a searched profile that matches a displayed profile of another zone (Z1), for example for search for suppliers of a particular type. In a fifth example (arrows $8_1$ and $8_2$), a user (U1) has a searched profile that matches a displayed profile of another user (U2) who is located in a zone (Z2). In the above cases, when the pairing involves a displayed profile, such displayed profile could also be the general profile. While the pairings have been described hereinabove in the sequence of "searched profile matches displayed profile" one skilled in the art will appreciate that the reverse, "displayed profile matches searched profile" will also lead to a pairing because pairings are bi-directional. The system server maintains information about the pairings identified on FIG. 8.

The PL calculation is made between the various general, searched and displayed profiles in order to determine if a contact may be established according to certain criteria such as for example a research from user towards zone and the reverse. The PL calculation may also be based on additional user profile elements that are not transmitted, but remain confidential within the system server 610.

Examples of pairings between a user, or his mobile terminal, and a zone are provided hereinabove. Given that pairings may also be established between two users or between two zones, the present disclosure further introduces other manners of providing zone-based services to users of mobile terminals. In an embodiment, a method for providing zone-based services to mobile terminals capable of accessing a zone comprises a detection of a presence of a first mobile terminal and of a second mobile terminal in the zone. For a first user, a displayed user profile, and a searched user profile are either activated on the system server or created according to this user needs. For a second user, a displayed user profile and a searched user profile are either activated on the system server or created according to this user needs. The system server then calculates a pairing between compatible elements of the first displayed user profile and of the second searched user profile, and/or between compatible elements of the first searched user profile and of the second displayed user profile. Communication may then be conditionally established between the first and second mobile terminals if the pairing meets or exceeds a threshold value. Optionally, in some embodiments, the first and second mobile terminals may receive information about the pairing and display dialog windows providing contact information about each other user, for example a phone number, an email address, or a physical location where the users can meet. As another option, the first and second mobile terminals may receive information regarding a type of profile, either general, displayed or searched, of the other user that has been used in establishing the pairing. In yet another embodiment, a method for providing zone-based services to users, comprising calculation of a pairing between compatible elements of the profile of a first and a second zone. A presence of a user is detected in the first zone. A communication between the user and a service of the second zone is conditionally established if the pairing meets or exceeds a threshold value.

Figure 9:
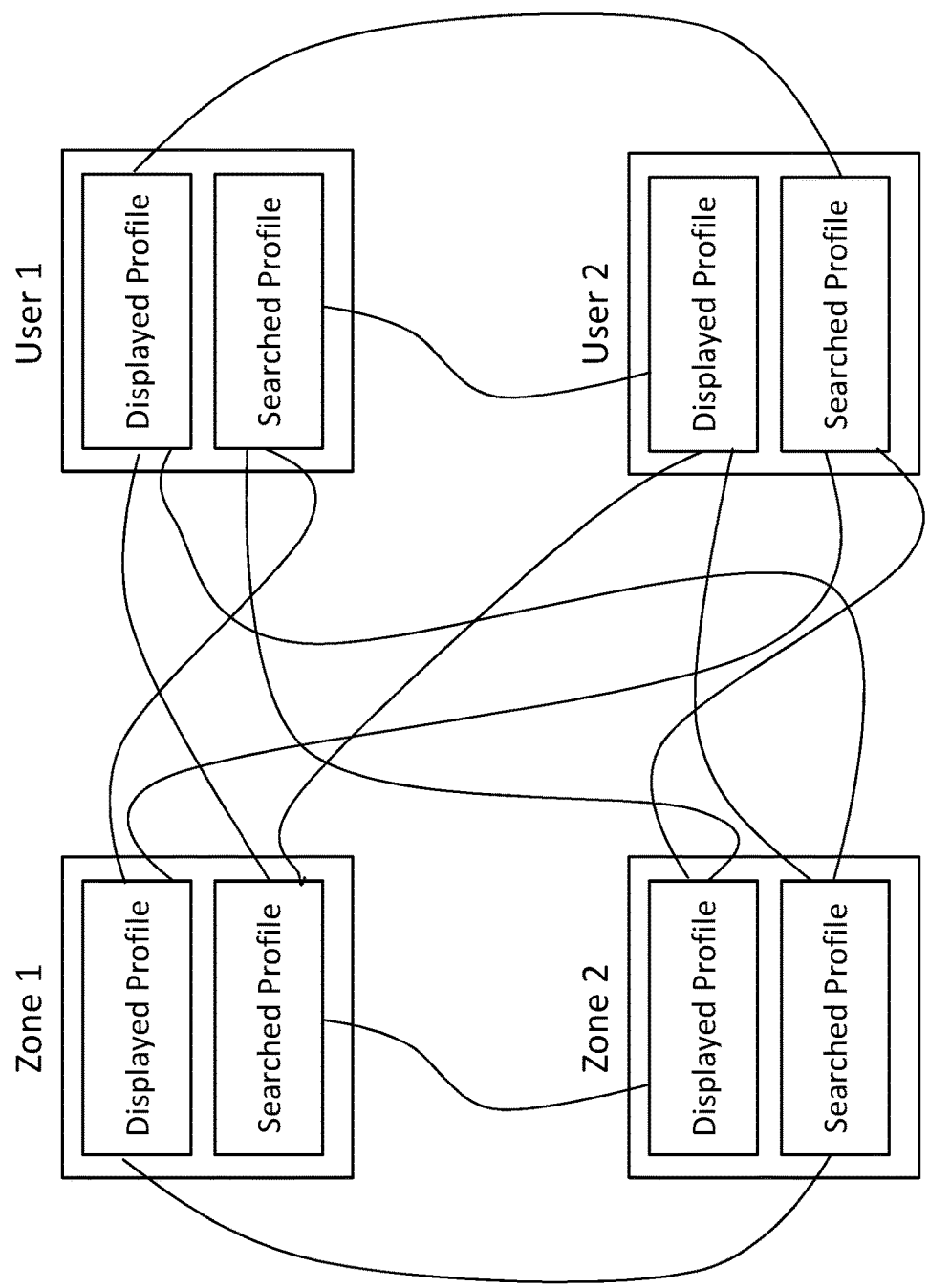
FIG. 9 shows a map of possible associations that may be established between various user profiles and zone profiles.

A general search without criterion may be made, for which a PL value may be determined for all possible relations. FIG. 9 shows a map of possible associations that may be established between various user profiles and zone profiles. It may be observed that pairings may in theory involve any searched profile, of a user or of a zone, placed in relation with any displayed or general profile of another zone or with any displayed or general profile of another user. In a large network comprising a plurality of zones and a large number of users, this may amount to an unmanageable number of possible pairings. In order to limit the quantity of calculations that could increase exponentially according to a number of zones and of users, searches may be carried out starting from zones appearing in a delimited area, such as a group of zones, and stop when a preset limited number of results is met or when a maximum search time is expired.

Figure 10:
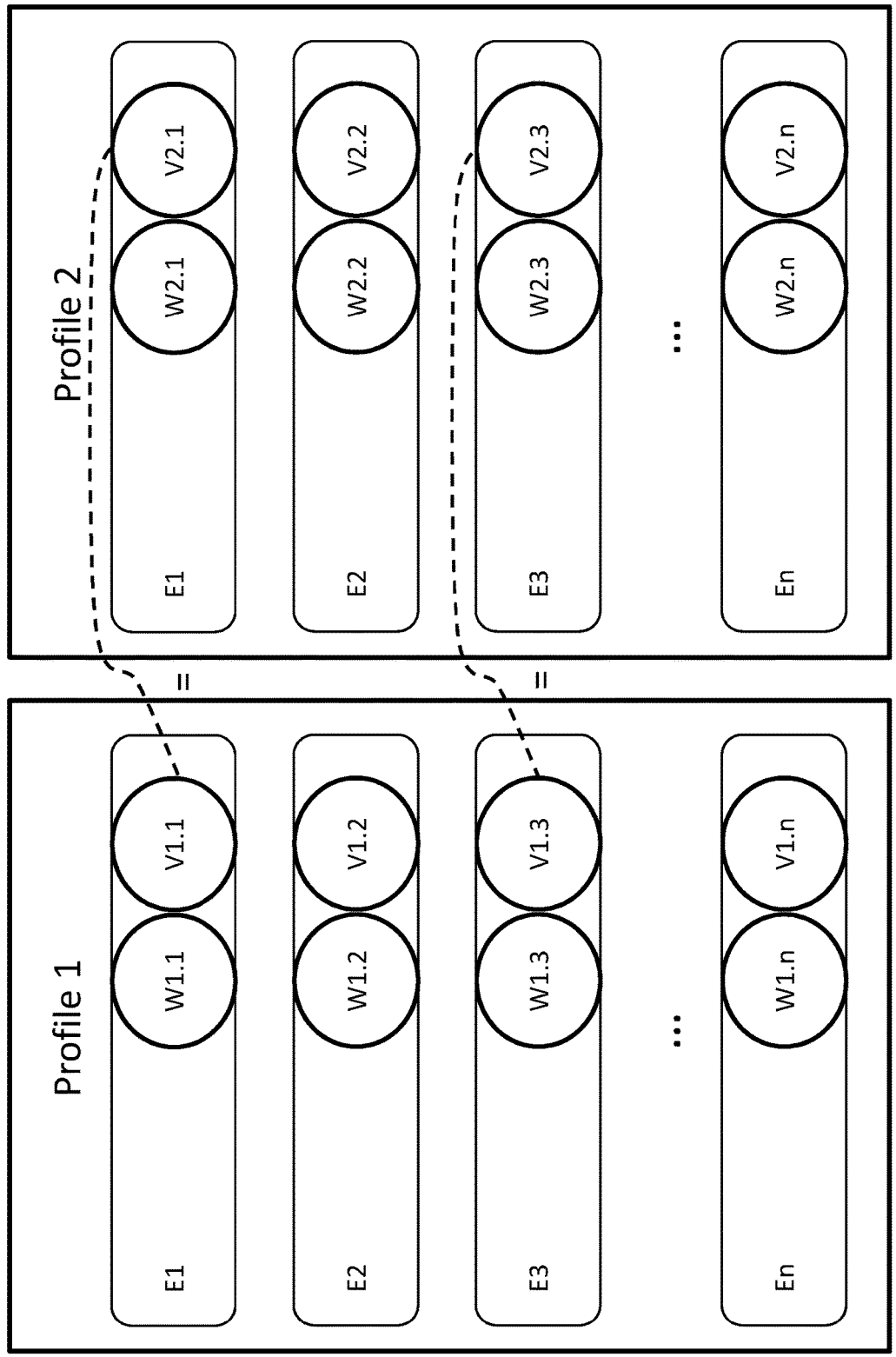
FIG. 10 is an illustration of an example of mapping of profile elements between two entities.

FIG. 10 is an illustration of an example of mapping of profile elements between two entities. Because a relationship may be established between a user and a zone, between two users or between two zones, two profiles identified as Profile 1 and Profile 2 on FIG. 10 may each represent a zone profile or a user profile. As a specific example, Profile 1 may be a displayed zone profile, for example the displayed profile of restaurant of a particular type, while Profile 2 may be a searched profile of a user for a particular type of zone, such as a restaurant of a particular type. Of course, this example is non-limiting and is solely intended to illustrate one of multiple possibilities for mapping profile elements.

In FIG. 10, labels having a format "Ex" designate profile elements. A value of a profile element is identified as "Vx.y", in which "x" represents one of Profiles 1 or 2 and "y" represents a particular profile element type. A level of weighting per profile element is identified as "Wx.y". Weighting level Wx.y may be determined by the system server based on the information contained in the profiles, this information being stored permanently or semi-permanently in a database of the system server. The weighting level Wx.y may alternatively be provided by the user or the zone for each of the profile elements. The two profiles may share some of the same compatible elements, while some other elements will be incompatible. A given profile element is found compatible, at least to some degree, when weighting level for the element type has a non-zero, positive value in both profiles.

As an example, a user may have in his profile two elements representing (a) an interest for Italian food and (b) an interest for science-fiction movies. A zone representing a restaurant may (a) have Italian food as a relevant element, but (b) will not have science-fiction movies as another relevant element. A weighting level for a profile element designating (a) Italian food will be greater than zero, while (b) another weighting level of zero will be assigned to a profile element designated science-fiction movies. In an embodiment, a template may be devised for calculating pairings between profiles. The template may comprise profile element values, and corresponding weightings, for profile elements related to a zone, for example to a restaurant. A user may fill the template with his own profile values, including by editing values from his profile, and a pairing between the user and the restaurant may be calculated by the system server. Those of ordinary skill in the art will be able to define other manners of applying weighting values to arrive at a finding of compatible and of incompatible elements.

When values V1.y and V2.y for a given element are compatible in the two profiles, a pairing (PL) is calculated according to respective weighting levels. Considering for example a case where V1.1=V2.1 and where V1.3=V2.3, the level of pairing between Profiles 1 and 2 ($PL_{1-2}$) may be calculated according to equation (1):

$$PL_{1-2} = W1.1 \times W2.1 + W1.3 \times W2.3 \quad (1)$$

As shown in equation (1), the weighting factors of both Profiles 1 and 2 are used to establish the pairing. In an embodiment, a contact may be established between the entities having the Profile 1 and the Profile 2 of FIG. 10 if the calculated $PL_{1-2}$ is greater than zero. In another embodiment, the contact may be established on the condition that $PL_{1-2}$ is equal to or higher than a threshold determined by the owner of Profile 1 or of Profile 2, by the zone or by the system server.

Alternatively, a simpler embodiment may be implemented without any weighting. In such an embodiment, a pairing may for example be established as long as, for a profile element type "y", a value V1.y and a value V2.y are non-zero in both profiles.

In addition to the above determination based on the pairing meeting a value set by a threshold, other criteria may also be added in the decision to establish a contact. An example of this is shown the fifth example (arrows 8) of FIG. 8, in which a user seeks another user, wherein an added criterion designating a given zone is also included. In addition to a sufficient pairing, another condition may stipulate a needed presence of one of the users in the zone for the pairing to be established.

It may be observed that a level of weighting Wx.y of a profile element may adopt a negative value. For example, in the case of a user seeking any type of restaurants with the exception of vegetarian restaurants, a level of high negative weighting for this last element of profile may be used to automatically exclude all vegetarian restaurants in any pairing calculation for this user.

Virtual Zones

Virtual zones may be defined for providing services related to businesses, to consultants, non-profit organizations, and the like, especially when these entities do not have any place of business that may be physically accessed by users. Of course, it is also possible for a commercial entity to operate both physical zones and virtual zones. These virtual zones do not have any geographical coverage and may thus not be "physically" visited. However, these virtual zones may be logically defined in the system server and may have their own profiles. As expressed hereinbefore, a user may communicate with a zone without physically accessing the zone. In the case of a virtual zone, a virtual visit may be the sole manner of accessing the zone. A user may access a virtual zone, for example, by means of a web browser accessing a web site of the virtual zone. Selection by the user, through his terminal, of a web link leading to the virtual zone then makes the virtual zone detect a presence, although a virtual one, of the user. The virtual zone and the user have their respective profiles and the system server may then establish a pairing between the virtual zone and the user.

EXAMPLES OF USE

Among the broad range of services offered by the disclosed system, applications may comprise safety applications, for example offering an efficient means to locate a lost child or to deliver public safety messages within one or many zones. Other applications may comprise targeted marketing, including publicity or individualized service offerings, complementary interaction with another media, software download, statistics management, announcements related to local events, automated payment, including but not limited to payment of fees when entering a movie theater or a museum, or payment of a fee when crossing a toll-bridge, the user terminal acting much like a smart card replacement, and the like. The following paragraphs present a series of application examples of the method and system of the present disclosure. These examples are not meant to be exhaustive and are not limiting.

Example 1

User Looking for a Particular Zone

A user wishes to find a nearby restaurant serving vegetarian food. His mobile terminal transmits to the system server, or activates in the system server, a searched profile, the searched profile comprising a profile element indicating a desire to find this type of restaurant. This profile element becomes a searchable item that the system server uses to establish a weighting level between the profile element and profiles of zones located within the same area of the user. Assuming that at least one zone profile contains an element typical of a vegetarian restaurant, the system server builds a list possible pairings between the user and this at least one zone. The list appears on a visual interface of the mobile terminal. In an embodiment, the list may appear as a local geographical map identifying a location of each zone that fulfills the search criteria. If the list is large, the user may also limit the range of the list. By selecting an item of the list or by pointing on a location on the map, the user may obtain data related to a selected zone. As a particular example of such data, one of the zones may advertise, for a limited time, a special deal for vegetarian dishes. An advertisement for this special deal may be part of a displayed profile for that particular zone, as the zone is searching for users that are interested in this type of vegetarian dishes. The user may select the zone on his mobile terminal; this may be facilitated when the mobile terminal presents the list as locations on a map. When the user enters the zone, his mobile terminal may be automatically detected by the detection system 400. The system server provides relevant information about the user to the zone so that the zone is aware of the presence of this particular user and of his particular interests in vegetarian dishes. Employees of the restaurant may then provide a personalized service to this user. By extension, when the user is a regular customer of this restaurant, the employees may adjust their service offering according to the habits and wishes of this privileged customer.

Example 2

User Looking for Another User

An employee takes part in a large congress bringing together 2000 participants. Once on the premises of the congress, this user creates or activates two searched profiles. On one hand, the user desires to meet suppliers for a type of materials used by the company that he represents. Although the congress presents many kiosks, the user is aware that several small and specialized independent suppliers are present at the event, in the hope of making new contacts, but cannot afford the cost of having their own kiosk or of displaying any publicity. Finding these suppliers may constitute a challenge. A first searched profile may thus indicate a desire to meet suppliers for a given type of materials. On the other hand, the user enjoys hunting in his spare time and would like to meet other people sharing the same interest, for drinks and dinner in the evening. A second searched profile may thus indicate a desire to socialize with other hunters at a given time within the congress premises. The system server treats independently the two searched profiles by proposing two lists of potential pairings, which may be ranked by level of weighting for each of the elements in the two profiles. The user may receive and alert announcing a found displayed user profile corresponding to one of the search criteria, for example a supplier of an interesting type of material. The user may then contact the material supplier and organize a meeting. Organizers of the congress may offer a specific meeting room for users of the present system. Later on, two or more users sharing an interest in hunting may meet for dinner, the system having established pairings between these users. Optionally, they may meet in a restaurant having its own displayed profile advertising a promotion for congress participants or for game hunters. In the present example, a given user having two distinct and unrelated profiles has been able to find a supplier and dinner companions.

Example 3

Zone Looking for users for Marketing Purposes

It is desired to attract the interest of customers having a given profile while present in a large-sized zone enclosing a department store. The zone has access through the system server to all profiles of users visiting virtually or physically its premises including all associated statistics. Following the analysis of these data the zone creates a searched user profile in the system server. The system server thus calculates pairing between the searched profile and the user profiles. The zone acquires the profiles of these potential customers and adjusts its sale promotion consequently. Information about the sale promotion is sent to the customers informing the customers that, for example a 50% rebate is being offered on particular goods located in a specific area of the store for the next 30 minutes. Other users of the system, who are not in the zone but who have asked the department store to be informed of any promotion, for example because the zone where the store is located is part of a list of favorite zones for these users, may also receive information about the sale promotion. Once these users access the zone where the department store is located, their presence is detected and they receive additional personalized information.

Example 4

User Looking for Another user in a Given Zone

A woman visiting a foreign city has been told of a city district known for its famous nightclubs. In order to select a nightclub, she consults the system to obtain a list of subscribed zones within the district. Five clubs are parts of zones subscribed to the system. For each club, the system server knows a number of users who are present and subscribed to the system. This woman's mobile terminal transmits to the system server a searched profile of users detected in at least one of the five zones. In turn, she receives information about other user profiles that may potentially form a good pairing with her searched profile. She consults these other user profiles and selects a club accordingly. When she enters the club's premises, her physical presence is automatically detected and a waiter offers her a free drink. In an embodiment, her profile may indicate her language of choice, or her country of origin, so that the waiter may address her in her mother tongue. The waiter may then direct the women to an area of the nightclub designated to users of the present system where she will meet other people having common interests. Evidently, the woman has at any time a choice of disseminating, or not, information elements of her general profile.

Example 5

Multiple Cases Occurring at a Summer Gathering

A gathering, for example a summer festival, takes place in a large but delimited area consisting of several zones. Users of the present system may benefit from a plurality of distinct services, in real-time. For example, a recording company may offer a price reduction on downloading to their mobile terminal music pieces of an artist being featured at the festival. This promotion may also offer downloading of an electronic rebate coupon, valid for a limited time, for the purchase of a CD of this artist. Meanwhile, organizers of the festival may accumulate vital statistics on, for example, a distribution of the number users of the present system having entered the event or crossed various zone boundaries at various times over the course of the event. Another service offered at the event may concern recovery of a lost child on the premises. Following a request from the child's parents, an alert broadcasted in coverage of the zone may be sent to all the users present in one or more zones associated with the event, the alert comprising a photograph of the child. As a user locates the child and responds to the alert, the child may rapidly be returned to her parents. Of course, distinct zones within the premises of the event may provide distinct services.

Those of ordinary skill in the art will realize that the description of the system, nodes and methods for providing zone-based services are illustrative only and are not intended to be in any way limiting. Other embodiments will readily suggest themselves to such persons with ordinary skill in the art having the benefit of the present disclosure. Furthermore, the disclosed system, nodes and methods may be customized to offer valuable solutions to existing needs and problems of zone-based services delivery.

Those of ordinary skill in the art will also appreciate that numerous types of user devices and wireless communication nodes or other apparatuses may embody aspects of the mobile or non mobile terminals and of the detection system described herein.

In the interest of clarity, not all of the routine features of the implementations of system, methods and nodes are shown and described. It will, of course, be appreciated that in the development of any such actual implementation of the system, methods and nodes, numerous implementation-specific decisions may need to be made in order to achieve the developer's specific goals, such as compliance with application-, system-, network- and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of mobile communications having the benefit of the present disclosure.

In accordance with the present disclosure, the components, process steps, and/or data structures described herein may be implemented using various types of processors, controllers, operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of process steps is implemented by a computer or a machine and those process steps may be stored as a series of instructions readable by the machine, they may be stored on a tangible medium.

Systems and modules described herein may comprise software, firmware, hardware, or any combination(s) of software, firmware, or hardware suitable for the purposes described herein. Software and other modules may reside on servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method for providing zone-based services to users, comprising:

defining, in a server, a profile of a user, the profile of the user including a plurality of elements referring to interests of the user;

defining, in the server, a profile of a zone, the profile of the zone including a plurality of elements referring to services provided by the zone, wherein the zone is selected from a geographical area, a physical area and a web site;

detecting, at the server, an access of a terminal of the user in the zone;

calculating, by the server, a pairing as a function of a number of matches between common elements of the profile of the zone and of the profile of the user; and forwarding, from the server to the terminal of the user, information including a service offer if the pairing meets or exceeds a threshold value.

2. The method of claim 1, comprising:

assigning a weighting value to each element of the profile of the user; and assigning a weighting value to each element of the profile of the zone;

wherein calculating the pairing further comprises calculating the pairing as a function of respective weighting values of the common elements.

3. The method of claim 2, comprising:

assigning greater than zero weighting values to elements of the profile of the user corresponding to interests of the user; and assigning a weighting value set to zero or to a negative value to elements of the profile of the user that do not correspond to interests of the user.

4. The method of claim 1, comprising:

receiving a displayed user profile from the user;

wherein the displayed user profile comprises a group of elements of the profile of the user that are selected by the user for transmission.

5. The method of claim 1, comprising:

assigning greater than zero weighting values to elements of the profile of the zone corresponding to services provided by the zone; and assigning a weighting value set to zero or to a negative value to elements of the profile of the user that do not correspond to services provided by the zone.

6. A method for providing zone-based services to users, comprising:

receiving, at a server, from a first terminal, a searched profile of a first user, the searched profile of the first user comprising one or more elements of a profile of another user that are searched by the first user;

receiving, at a second terminal of a second user, the searched profile of the first user;

forming, at the second terminal, a displayed profile of the second user, the displayed profile of the second user comprising one or more elements of a profile of the second user that are selected by the second terminal for transmission to the server in response to a content of the searched profile of the first user;

receiving, at the server, from the second terminal, the displayed profile of the second user;

calculating, in the server, a pairing between common elements of the searched profile of the first user and of the displayed profile of the second user;

detecting, at the server, an access of the second terminal of the second user in a zone, wherein the zone is selected from a geographical area, a physical area and a web site; and controlling, by the server, establishment of a communication between the first and second terminals of the first and second users if the pairing meets or exceeds a threshold value.

7. The method of claim 6, comprising:

detecting an access of the first terminal of the first user in the zone.

8. The method of claim 6, wherein:

the zone comprises the web site and the second user is accessing the web site.

9. A system for providing zone-based services to users, comprising:

a plurality of detection systems associated with zones and adapted for detecting accesses of the users in the zones, wherein each zone is selected from a geographical area, a physical area and a web site; and a server communicatively coupled to the detection systems and comprising a database adapted for storing a profile of each zone and for storing a profile of each user, wherein the profile of each user includes a plurality of elements referring to interests of the user and wherein the profile of each zone includes a plurality of elements referring to services provided by the zone;

wherein the server is configured to:
- receive from a detection system associated with a given zone information about an access to the given zone by a terminal of a given user,
- calculate a pairing as a function of a number of matches between common elements of a profile of the given zone and of a profile of the given user, and
- forward to the terminal of the given user information including a service offer to the given user if the pairing meets or exceeds a threshold value.

10. The system of claim 9, wherein:
the database is further configured to assign a weighting value to each element of the profile of the given zone and to assign a weighting value to each element of the profile of the given user; and
the server is further configured to calculate the pairing as a function of respective weighting values of the common elements.

* * * * *